United States Patent
Kuratle

(12) 
(10) Patent No.: US 6,407,819 B1
(45) Date of Patent: Jun. 18, 2002

(54) METHOD AND DEVICE FOR MEASURING FIBRE LENGTH

(75) Inventor: Christoph Kuratle, Saland (CH)

(73) Assignee: Maschinenfabrik Rieter AG, Winterthur (CH)

( * ) Notice: Subject to any disclaimer, the term of this patent is extended or adjusted under 35 U.S.C. 154(b) by 0 days.

(21) Appl. No.: 09/600,748

(22) PCT Filed: Jan. 20, 1999

(86) PCT No.: PCT/EP99/00344

§ 371 (c)(1),
(2), (4) Date: Nov. 13, 2000

(87) PCT Pub. No.: WO99/37973

PCT Pub. Date: Jul. 29, 1999

(30) Foreign Application Priority Data

Jan. 22, 1998 (DE) .......................................... 198 02 315
Dec. 31, 1998 (DE) .......................................... 198 60 864

(51) Int. Cl.⁷ ............................................... G01B 11/02
(52) U.S. Cl. ..................................... 356/634; 348/142
(58) Field of Search .............................. 356/335, 336, 356/337, 338, 339, 625, 634, 635, 640, 246; 348/142

(56) References Cited

U.S. PATENT DOCUMENTS

| | | | |
|---|---|---|---|
| 4,205,973 A | | 6/1980 | Ryan |
| 4,266,874 A | | 5/1981 | Janin et al. |
| 4,962,569 A | * | 10/1990 | Hosel ........................ 19/106 R |
| 5,184,733 A | | 2/1993 | Arnarson et al. |
| 5,311,290 A | * | 5/1994 | Olson et al. ................. 356/383 |
| 5,594,544 A | | 1/1997 | Horiuchi et al. |
| 5,786,894 A | | 7/1998 | Shields et al. |

FOREIGN PATENT DOCUMENTS

| | | |
|---|---|---|
| DE | 3230523 A1 | 9/1983 |
| DE | 4124174 C1 | 9/1992 |
| EP | 764477 A1 | 3/1997 |
| WO | 9114169 | 9/1991 |
| WO | 9915877 | 4/1999 |

OTHER PUBLICATIONS

PCT International Preliminary Examination Report, Apr. 20, 2000.
International Search Report, Jun. 16, 1999.
German Search Report, Nov. 25, 1998.

* cited by examiner

*Primary Examiner*—Hoa Q. Pham
(74) *Attorney, Agent, or Firm*—Dority & Manning

(57) ABSTRACT

A method and apparatus for measuring the length of fibers is provided. The method includes the steps of separating the fibers in order to obtain a fiber in single form. The method further involves passing the fiber by an optical measurement system that optically images the fiber. Another step includes calculating the length of the fiber by measuring an increment of the fiber in the x coordinate plane, the y coordinate plane, and the z coordinate plane. Also, the method involves repeating this step to obtain additional increment measurements. These measurements are placed into an equation to compute the length of the fiber. The apparatus for measuring the length of separated fibers from a fiber band includes an apparatus for separating the fiber from the fiber band. Further, a duct is provided for transporting the fiber. At least one camera is proximate to the duct for obtaining an image of the fiber, and a computer is connected to the camera. The computer is configured to assign numerical values to image points of the image of the fiber in the x, y, and z directions. The computer uses the image points to incrementalize the image of the fiber. Also, the computer measures each increment and places the increments into an equation to determine the length of the fiber.

16 Claims, 3 Drawing Sheets

$$L = \sum_{i=1}^{n} \sqrt{(x_i - x_{i+1})^2 + (y_i - y_{i+1})^2 + (z_i - z_{i+1})^2}$$

METHOD AND DEVICE FOR MEASURING FIBRE LENGTH

BACKGROUND

Various procedures and apparatuses are known for the measuring of the length of fibers. These procedures divide themselves mainly into two categories, the one being dedicated to single fiber measurement, and the other dealing with fibers in bundles. In the case of the single fiber measurement those fibers, especially the fibers present in fiber bands, for instance the fiber band of a carding machine, are again dispersed. This is accomplished by a stretchworks or a disintegrator, with the alternate possibility of carrying out the operation pneumatically or even by hand. The individual fibers are subsequently measured either with the equivalent of a ruler or, for instance, by electronic methods. As to the latter, the fibers pass a light relay with the help whereof signals may be gathered which serve for the measurement of the fiber length.

Where bundled fibers are concerned, the entire bundle is placed under mechanical tension, whereby the fibers orient themselves more or less in parallel. The fibers are then subjected to a line sensor. The line sensor can be mechanical, optical, or capacitive, which will work-up a so-called packing-diagram which can be applied to the determination of the length of the fibers being stacked.

These procedures possess in common the disadvantage that during the measurement the fibers are not fully stretched out, or are not lying parallel to one another, or in an unfortuitous situation are subject to both. This disadvantage leads to inexactness in the measurement because in measuring systems for fiber length up to this time, these positional aberrations were not compensated for.

Besides this, the known measuring devices have the disadvantage in that for the most part, they can be automatized only with great difficulty.

SUMMARY

A principle purpose of the present invention is to propose a method and a device for measuring the length of fibers, wherein the disadvantages of the state of the technology are overcome and a simple, at least partial, automatization is enabled and an exact measurement of the length of the individual fiber is made possible.

Additional objects and advantages of the invention will be set forth in part in the following description, or may be obvious from the description, or may be learned through practice of the invention.

By means of capturing the fiber optically in two projection planes, the goal is advantageously reached that regardless of in which position the fiber is found, or whether the fiber is found in a stretched condition or not, its length is optically fixed and can be measured. When two projection planes are employed, however, the true length of the fiber is exhibited. Particularly advantageous is the situation wherein the two projection planes stand essentially at right angles to one another. The achievement thereby is that a perfect, projected depiction of the fiber becomes possible so that the exact length of the fiber can finally be determined regardless of how much the fiber in its orientation departs from the ideal straight line. A particularly simple method can be set up utilizing these advantages in which one camera for the photographing of at least one projection is a "line-camera" which delivers line shaped images. A plurality of images taken in a short time-period sequence, that is to say, reproductions on the projected plane, produce images, which when considered with knowledge of the velocity of the fibers, yield the projection of the fiber in the plane parallel to the line-camera.

If the fiber, in its composite entirety, is optically imaged over a short period of time in both projection planes, and the exact, instantaneous projected length of the fiber is captured, then the goal can be achieved that the influences which are to be ascribed to the speed of the fiber, can be practically totally eliminated. In this way, the achievement is made that an exact optical reproduction of the fiber is brought about.

For this purpose, advantageously, the fiber can be illuminated during a short time interval which can be done by a flash generator, which can be activated by a stroboscope.

In doing this, it is particularly advantageous to so control the flash that the fibers are detected by a sensor, and this sensor activates the flash. The light flash is then generated when the fibers place themselves in an optimal position in relation to the measurement system. For this purpose, the sensor is connected with the flash by means of a control line. The flash can then illuminate the fibers in the line of sight of the of the optical measurement system, or if preferred in the reverse direction with counter incidence light.

It is advantageous to so spatially install the two projection planes upon which the fibers are to be depicted or captured, that their intersection line runs essentially parallel to the direction of transport of the fibers. By this alignment, the favorable situation is reached in which the fibers in both projection planes are pictured in an advantageous, essentially stretched condition. By means of the conveyance of the fiber by the transport air, the fiber extends itself advantageously in the direction of flow and is at least preponderantly stretched and is so displayed on the projection planes. For the measurement of the length of the fiber, advantageously the projection is dissected into individual image points. The two projection planes together are graduated into a two-dimensional coordinate system. This permits the distance differential of individual points of the picture to be picked out. Now, the image of the projection of the fiber finds itself in the projection planes, and by viewing the two dimensional coordination system, the exact length of the projection of the fiber is depicted in exact length. This can be determined by the distance apart of the individual image points.

In carrying this out, it is particularly advantageous to dissect the projection of the fiber into as many points as possible whereby an especially exact measurement of the length is possible. At best, the dissection of the image points is done for each of the two projections of the fiber.

Providing the same number of image points for each of the two projections is highly recommended. For instance, this can be achieved by two line-cameras so that each optically captures its respective fiber at the same time.

A particularly favorable arrangement is when the image points of the projection coincide exactly with the points of the true fiber, because in this way the purpose will be achieved of an exact length determination of the fiber. By means of a common coordinate axis, the two coordinate systems of the projections will favorably enable attaining the purpose in a simple way. For the determination of the true length of the fiber, the coordinates of the projected image points are assigned numerical values, and the length of the fiber can be determined by processing in a computer. For this reason, the described computation of $$L = \sum_{i=1}^{n} \sqrt{(x_i - x_{i+1})^2 + (y_i - y_{i+1})^2 + (z_i - z_{i+1})^2}$$

for computer data processing of the numerical values of the coordinates of the projected image points can be advantageously employed.

By the application of a measuring system with at least one camera, an apparatus for the separation of the fibers, and a computer, the goal can be attained that the invented method can be executed in a simple manner.

Particularly advantageous for the separation of the fibers is a rotatable roll circumferentially inset with needles or teeth. These are used because they can separate the fibers especially safely and at the same time protect them. Advantageously, a duct for the transport of the fibers up to the camera point can be installed, because thereby an exact positioning of the now separated fibers in relation to the camera, that is the optical system, is assured. At best, the measurement system will have a sensor which monitors the fibers, and for instance can be placed near the camera for the control of the device. In order to enable a reliable, optical capture of the fibers, the measurement system is provided with a lamp for the illumination of the fibers. Advantageously this lamp comprises a flash or a stroboscope. Favorably, in this case, the sensor is connected over a control line with the flash in order to illuminate the fiber at the correct instant. In a further advantageous embodiment, the device in accord with the present invention includes a mirror which reflects an image of the fiber to be measured in the direction of the camera. The advantage of this arrangement lies therein that it is possible to capture both projections with only one camera.

Particularly advantageous is a sensor to determine the velocity of the fibers, because in this way advantageous line-cameras can be used for the generation of the projection of the fiber. The computer unit can, along with the measurement values, advantageously determine the projection of the fibers and present these in a coordinate system.

By an additional invented procedure, advantageously the thickness of a fiber can be determined. For this purpose, the projection is so additionally processed that first in the image of the fiber, a center line is established across which a perpendicular line is erected. Thus, the intersection of the perpendicular line with the depicted outlines of the fiber is determined. The length differential between these peripheral lines, one to the other, yields a measure for the thickness of the fiber. Along the length of the fiber, a multitude of perpendicular lines intersecting the center line may be drawn, generating also a plurality of outline intersecting point pairs. The number thereof is chosen in accord with the desired degree of exactness for the statement of fiber thickness. With this invented method, advantageously even the variation in the thicknesses of the fiber along its length can be determined.

BRIEF DESCRIPTION OF THE DRAWINGS

In the following, the invention will be described with the aid of the drawings. There is shown in.

DETAILED DESCRIPTION

Figure 1:
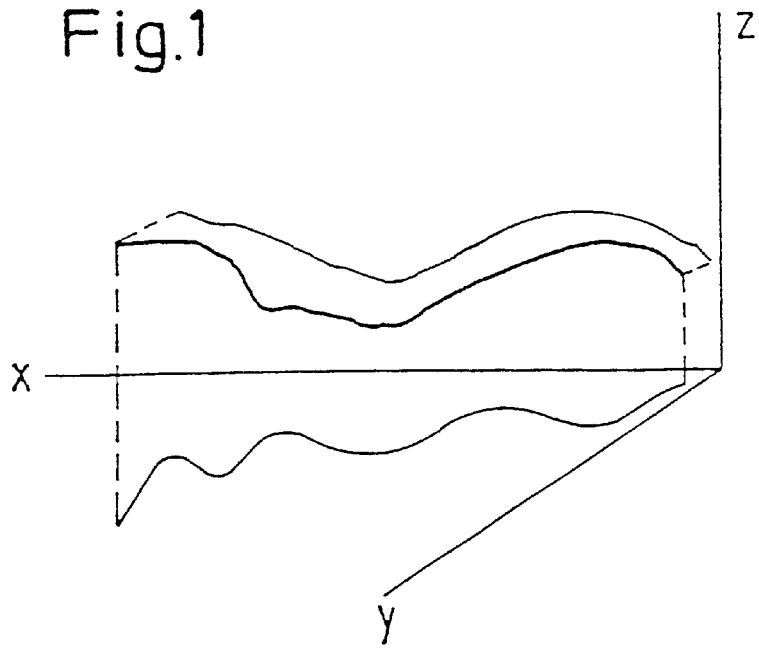
FIG. 1 a perspective presentation of a fiber, along with two projection planes deposed at right angles one to the other, and shown also is the projected image of the fiber on each of the two projection planes, projected image being formed by perpendiculars from the true fiber image to the respective planes, FIG. 2 a schematic view of an apparatus in accord with the invention, with a disintegrating roll as well as an optical measurement system, FIG. 2a a schematic perspective, the optical measurement system of FIG. 2, FIG. 3 a presentation of the projected views of a fiber on the two planes shown in FIG. 2, FIG. 4 a schematic view of a device for the measurement of the length of fibers, in which a fiber projection made by a mirror reflecting to a camera is presented, and FIG. 5 an illustration of a fiber with a presentation of the centerline for the determination of the fiber thickness.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still, a third embodiment. It is intended that the present invention include these and other modifications and variations.

FIG. 1 shows a perspective presentation of a single fiber, as well as its projection onto two mutually perpendicular projection planes. One of the planes is designated by the coordinate axes xy, the second plane by the coordinates xz. The two projection planes xz and xy are perpendicular to one another, and possess the axis x in common. By means of. the two projections, the fiber can be geometrically presented as two mathematical curves, with the aid of which an exact length determination of the fiber can be made.

Figure 2:
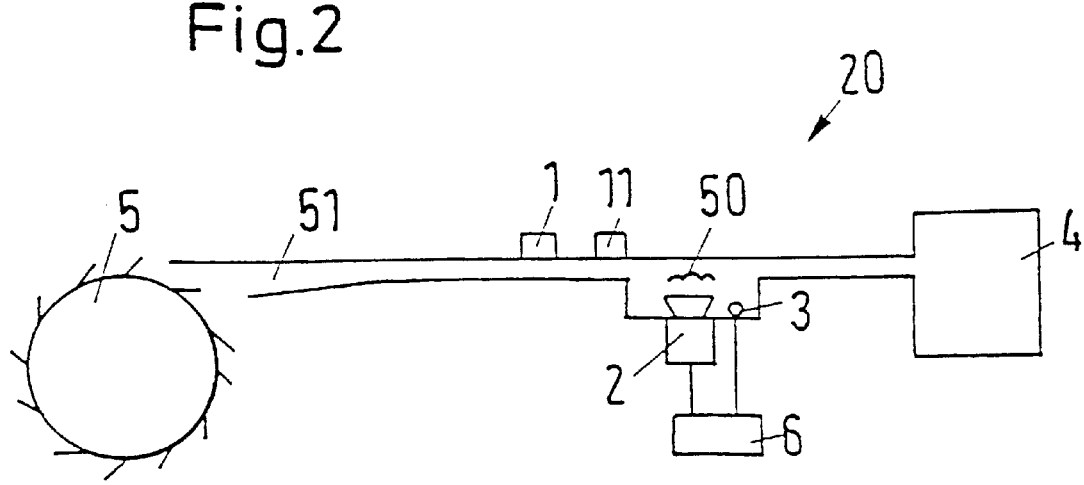
Figure 2A:
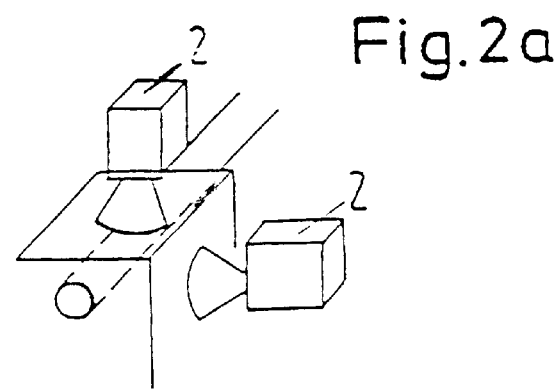

FIG. 2 depicts a principal presentation of the invented device for the execution of the method of the present invention. The device 20 for the measurement of the length of dispersed fibers 50 possesses two cameras 2 (see FIG. 2a), which are disposed perpendicularly to one another. The two cameras 2 respectively view the projection planes xz and xy (see FIG. 1). The device 20 possesses an apparatus 5 for the disintegration of fiber material into individual fibers 50.

The apparatus 5 for the disintegration of the fiber material comprises a known disintegrator roll which is equipped with teeth and combs the individual fibers out of the fiber material. These individual, separated fibers now proceed through the duct 51 into the zone of the camera 2 where the optical capture of the projections of the fiber 50 occurs. In the duct 51 is placed a sensor 1 which detects a single fiber in its passing and controls the device 20. The sensor 1 delivers a control signal to a control center (not shown). The controlling can also be carried out by the computer unit 6. As soon as the sensor 1 detects an individual fiber 50, a flash is generated simultaneously from the flash lamp 3 so that this precisely illuminates the fiber 50 at the time that the fiber 50 finds itself before the cameras 2. The short time interval illumination of the flash has such an effect that a sharp image of the fiber is made by the cameras 2. After the passing of the fiber 50 from the camera zone, the fiber 50 reaches the area of a filter 4 where its flight is arrested. A suction producing element (not shown) sets in motion the air flow for the air in duct 51 which attends to the transport of the fiber 50 in the direction of the filter 4. The cameras 2 are electronic cameras which produce pictures which arise from single image dots. The images from these cameras 2 can be digitalized and thereby input to a computer and further processed.

By this means, it is especially simple to increment the detected projections into single image dots and to attribute to these coordinates on the respective projection planes. These coordinates can then be further processed in the computer unit 6. The computer unit 6 possesses also a control component which accepts the signal of the sensor 1 and the signal for the flash 3.

In another method for measurement, consideration is given to permitting the computers 6 to activate the cameras 2 for only a very short time interval while the fiber 50 is continually illuminated. This also provides a sharp reproduction of the fiber 50 onto its projection planes.

If a line-camera (not shown) is used for the capture of the projection of the fiber, then the velocity of the fiber is obtainable. The measurement device 20, in this case, possesses a speed sensor 11 for the determination of the velocity of the fiber to be measured. The measurement of velocity can also be advantageously determined by the measurement of the velocity of the transport air flow.

In the case of the use of the line-cameras, the computer unit 6 directly establishes the position of the measurement points $x_i,y_i$ and $x_i,z_i$ (see below), which then can be immediately reprocessed (see Description, FIG. 3).

Figure 3:
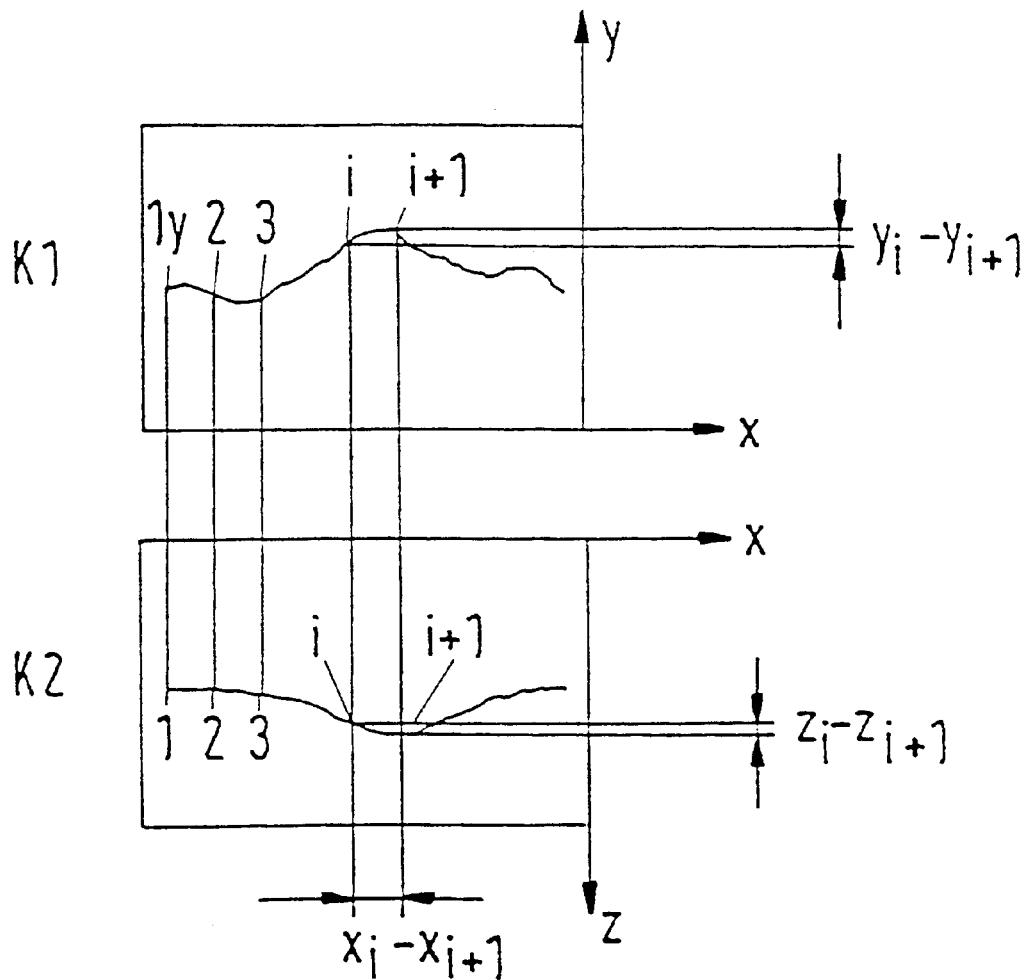

In a graphical form, FIG. 3 explains the method for the determination of the length of the fiber. The projection K1, taken by the first camera is shown above and established in the coordinate system xy. The second camera records the projection K2, which is reproduced in the coordinate system xz. The projection of the true fiber appears as a line, which is incrementalized for the calculation of the length of the fiber, point by point (such as $x_i,y_i$ in one projection and $x_i,z_i$ in the second projection). The number of the individual points is dependent as to the desired degree of accuracy of the measurement, since the more individual points are measured in a projection, more exact can the length of the fiber be determined. The number of the individual points is in turn dependent upon the technical possibilities of the cameras and those of the computer.

The measured point 1y (see FIG. 3) shows the beginning of the fiber and possesses in the coordinate axis x the same value, since the x-axis is a common coordinate axis for both projections. Subsequently, the projections are incrementalized into a finite number of individual points (n points). These points are input into the computer unit in accord with their position in the coordinate system, and further processed according to the following computer equation so that the exact length of the fiber can be determined. For this purpose, the following formula is employed wherein L represents the length of the fiber:

$$L = \sum_{i=1}^{n} \sqrt{(x_i - x_{i+1})^2 + (y_i - y_{i+1})^2 + (z_i - z_{i+1})^2}$$

Figure 4:
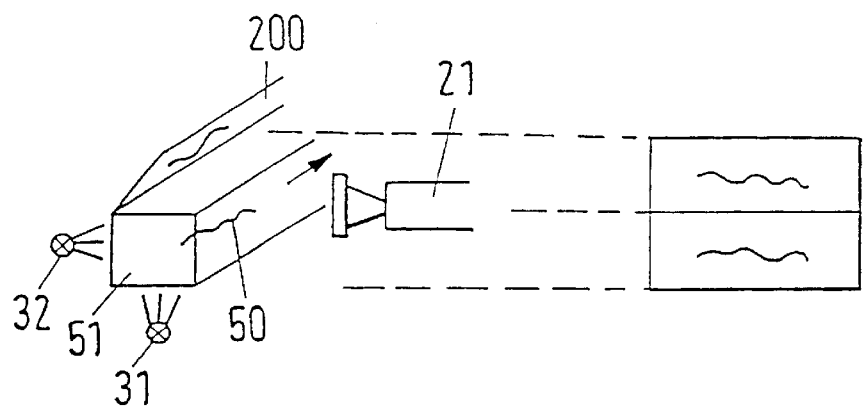

FIG. 4 shows a principal presentation of the device for the measuring of the length of individual fibers in which the projections are captured by only one camera 21. This is carried out in that one projection is reflected from a mirror and the image is cast in the direction of the camera 21. The flash 31 illuminates the fiber 50 from below and casts the image in the camera 21 direction, while the flash 32 illuminates the fiber 50 in counter directed light to the same camera 21. To the right of the camera 21 are exhibited the two projections as they have captured by the camera 21. In the computer unit, the image captured by the camera 21 is divided into two, and as in the manner shown above the length of the fiber is determined. The duct 51 is an enclosed duct which in the zone of the camera 21 is transparent. It is for instance constructed of glass.

Figure 5:
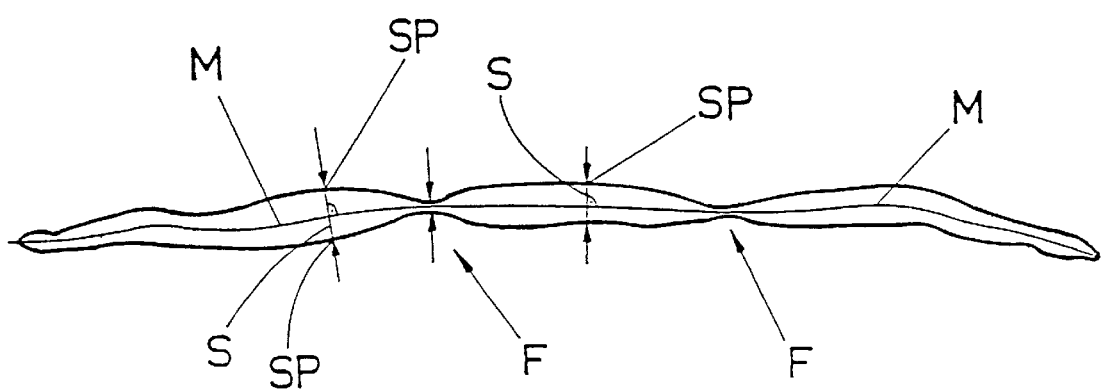

In FIG. 5, the procedure for finding the thickness of the fiber is explained. The illustration shows as an example a cotton fiber. The original image obtained by camera in which the fiber is first shown in its entirety, i.e. black, is further so processed by means of an image rework program, for instance OPTIMAS of the firm BioScan, Inc., Edmonds, USA, that only the outline of the fiber remains. Likewise, by means of image processing, the effective centerline M is established and added to the representation of the fiber.

At an optionally selected number of locations, subsequently, perpendiculars S are erected across the centerline M which cut the outline of the fiber into the intersection points SP. The distance apart of the two intersection points SP from one another yields a measure for the thickness of the fiber. A cotton fiber possesses essentially an oval cross-section and the fiber itself is, over its length, twisted. The positions F delineate the fiber at the positions of its lesser cross sections. The oval cross-sectional shape of the fiber possesses practically a constant ratio between the length and breadth of the cross-section of the fiber. The twisting of the fiber has the result in the depiction that its greatest stretching out is found always between two of the positions F. By consideration of this, the fiber thickness can be fairly exactly determined.

The presentation of the image should be chosen of such a size that the perpendiculars S can be incremented into a sufficient number of image pixels in order to obtain a sufficient exactness of the measurement. For instance, in the zone where the perpendicular S cuts through the greatest cross-section of the fiber about 100 pixels are available.

It should be understood that the invention includes various modifications that can be made to the embodiments of the method and device for measuring fiber length described herein as come within the scope of the appended claims and their equivalents.

What is claimed is:

1. A method for measuring the length of fibers comprising the steps of:

separating the fibers in order to obtain a fiber in single form;

passing the fiber by an optical measurement system that further performs the steps of:
optically imaging the fiber into a first projection plane to create a projection;
optically imaging the fiber into a second projection plane to create a projection;
capturing the projection created in the first projection plane; and
calculating the length of the fiber by using at least the captured projection from the first projection plane and the captured projection from the second projection plane;

for each projection, incrementing the captured projection into at least two single image points in a two dimensional coordinate system, wherein the two dimensional coordinate system corresponding to the first projection plane and the two dimensional coordinate system corresponding to the second projection plane share a common coordinate axis;

wherein the step of calculating the length of the fiber includes assigning numerical values to the locations of the image points in the two dimensional coordinate systems and using the differences between these values to determine the true length of the fiber; and wherein the step of calculating the length of the fiber employs the following computational equation for length L as a basis:

$$L = \sum_{i=1}^{n} \sqrt{(x_i - x_{i+1})^2 + (y_i - y_{i+1})^2 + (z_i - z_{i+1})^2};$$

wherein $x_i$ is a point of the fiber in the x coordinate direction, $x_{i+1}$ is the next point of the fiber in the x coordinate direction, $y_i$ is a point of the fiber in the y coordinate direction, $y_{i+1}$ is the next point of the fiber in the y coordinate direction, $z_i$ is a point of the fiber in the z coordinate direction, $z_{i+1}$ is the next point of the fiber in the z coordinate direction, and n is the number of intervals.

2. An apparatus for measuring the length of separated fibers from a fiber band comprising:

an apparatus for separating the fiber from the fiber band;

a duct for transporting the fiber;

at least one camera proximate to the duct for obtaining an image of the fiber;

a computer connected to the camera for calculating the fiber length from the image of the fiber, the computer configured to assign numerical values to image points of the image of the fiber in the x, y, and z direction, and use the image points to incrementalize the image of the fiber, and measure each increment, and place the increments into an equation to determine the length of the fiber.

3. The apparatus for measuring the length of separated fibers from a fiber band of claim 2, wherein the apparatus for separating the fibers is a rotational roll equipped with nails or teeth.

4. The apparatus for measuring the length of separated fibers from a fiber band of claim 2, further comprising a sensor in the duct for the detection of the fiber.

5. The apparatus for measuring the length of separated fibers from a fiber band of claim 2, further comprising a lamp proximate to the camera for the illumination of the fiber.

6. The apparatus for measuring the length of separated fibers from a fiber band of claim 5, wherein the lamp is a flash.

7. The apparatus for measuring the length of separated fibers from a fiber band of claim 6, further comprising a sensor for the detection of the fiber, and wherein the sensor is connected to the flash lamp by a control line.

8. The apparatus for measuring the length of separated fibers from a fiber band of claim 6, wherein two flash lamps are provided which illuminate the fibers from various sides.

9. The apparatus for measuring the length of separated fibers from a fiber band of claim 2, further comprising a mirror that is used to project the image of the fiber to the camera.

10. The apparatus for measuring the length of separated fibers from a fiber band of claim 9, wherein the mirror is used to send a first projection of the fiber to the camera at the same time a second projection of the fiber is sent to the camera.

11. The apparatus for measuring the length of separated fibers from a fiber band of claim 2, further comprising a velocity sensor for the determination of the speed of the fiber.

12. A method for measuring the length of fibers comprising the steps of:

separating the fibers in order to obtain a fiber in single form;

passing the fiber by an optical measurement system that optically images the fiber;

calculating the length of the fiber by measuring an increment of the fiber in the x coordinate plane, the y coordinate plane, and the z coordinate plane, and by repeating this process to measure additional increments, and placing these measurements into an equation to compute the length of the fiber.

13. The method for measuring the length of fibers of claim 12, wherein the fiber remains at essentially the same position in the optical measurement system when the fiber is optically imaged by the optical measurement system.

14. The method for measuring the length of fibers of claim 12, further comprising the step of illuminating the fiber by a light flash.

15. The method for measuring the length of fibers of claim 12, further comprising the steps of:

sensing the fiber upon the fiber's entry into the optical measurement system; and controlling the optical measurement system with the aid of a signal produced from the step of sensing the fiber.

16. the method for measuring the length of fibers of claim 15, further comprising the step of illuminating the fiber by a light flash, the light flash is controlled by the signal produced from the step of sensing the fiber.

* * * * *